(12) United States Patent
Zhang et al.

(10) Patent No.: US 8,209,988 B2
(45) Date of Patent: Jul. 3, 2012

(54) MAGNETIC REFRIGERATION DEVICE

(75) Inventors: Ming Zhang, Ballwin, MO (US); Sesha Madireddi, St. Charles, MO (US)

(73) Assignee: Husssmann Corporation, Bridgeton, MO (US)

( * ) Notice: Subject to any disclaimer, the term of this patent is extended or adjusted under 35 U.S.C. 154(b) by 937 days.

(21) Appl. No.: 12/236,583

(22) Filed: Sep. 24, 2008

(65) Prior Publication Data

US 2010/0071383 A1    Mar. 25, 2010

(51) Int. Cl.
F25B 21/00    (2006.01)
F25B 21/02    (2006.01)

(52) U.S. Cl. .................................. 62/3.1; 62/3

(58) Field of Classification Search ................. 62/3, 3.1, 62/3.7, 6, 114, 324.2, 335, 467; 335/146, 335/174, 179, 215–216, 220, 228, 288–289, 335/303, 306
See application file for complete search history.

(56) References Cited

U.S. PATENT DOCUMENTS

| | | | |
|---|---|---|---|
| 2,489,264 A | 11/1949 | Byrd, Jr. | |
| 3,325,758 A | 6/1967 | Cook | |
| 3,354,833 A * | 11/1967 | Laing | 417/353 |
| 3,768,054 A | 10/1973 | Neugebauer | |
| 3,781,592 A | 12/1973 | Harrold | |
| 3,855,498 A | 12/1974 | MacMaster et al. | |
| 4,033,734 A * | 7/1977 | Steyert et al. | 62/3.1 |
| 4,222,021 A | 9/1980 | Bunker, Jr. | |
| 4,332,135 A * | 6/1982 | Barclay et al. | 62/3.1 |
| 4,408,463 A | 10/1983 | Barclay | |
| 4,441,325 A | 4/1984 | Bon-Mardion et al. | |
| 4,507,927 A * | 4/1985 | Barclay | 62/467 |
| 4,532,770 A * | 8/1985 | Hakuraku et al. | 62/3.1 |
| 4,536,230 A | 8/1985 | Landa et al. | |
| 4,549,155 A | 10/1985 | Halbach | |
| 4,589,953 A * | 5/1986 | Nakagome et al. | 216/22 |
| 4,614,930 A | 9/1986 | Hickey et al. | |
| 4,625,519 A * | 12/1986 | Hakuraku et al. | 62/3.1 |
| 4,642,994 A * | 2/1987 | Barclay et al. | 62/3.3 |
| 4,702,090 A | 10/1987 | Barclay et al. | |

(Continued)

FOREIGN PATENT DOCUMENTS

DE    804694    4/1951

(Continued)

OTHER PUBLICATIONS

Office Action from the United States Patent Office for U.S. Appl. No. 12/245,467 dated Jul. 20, 2011 (9 pages).

Primary Examiner — Frantz Jules
Assistant Examiner — Emmanuel Duke
(74) Attorney, Agent, or Firm — Michael Best & Friedrich LLP (57) ABSTRACT

A magnetic refrigeration device for transferring heat including a shaft rotatable about an axis, an inner magnet disposed at one of the axis and a radial distance from the axis, an outer magnet disposed a radial distance from the axis outside of the inner magnet defining a magnetic gap between the inner and outer magnets, and magnetocaloric material disposed at a radial distance from the axis between the radial distances of the inner and outer magnets. The magnetocaloric material is coupled to the shaft for rotation with the shaft about the axis such that during rotation of the shaft a portion of the magnetocaloric material alternates between a magnetized position disposed within the magnetic gap and a demagnetized position outside of the magnetic gap.

27 Claims, 6 Drawing Sheets

U.S. PATENT DOCUMENTS

| | | | |
|---|---|---|---|
| 4,717,876 A | | 1/1988 | Masi et al. |
| 4,727,722 A | | 3/1988 | Kirol |
| 4,785,636 A | * | 11/1988 | Hakuraku et al. ............... 62/3.3 |
| 4,956,976 A | | 9/1990 | Kral et al. |
| 4,999,600 A | | 3/1991 | Aubert |
| 5,024,059 A | * | 6/1991 | Noble ............................... 62/3.1 |
| 5,034,715 A | | 7/1991 | Leupold et al. |
| 5,075,662 A | | 12/1991 | Leupold et al. |
| 5,091,361 A | | 2/1992 | Hed |
| 5,182,914 A | | 2/1993 | Barclay et al. |
| 5,249,424 A | | 10/1993 | DeGregoria et al. |
| 5,352,302 A | | 10/1994 | Takagi et al. |
| 5,506,558 A | | 4/1996 | Laube |
| 5,512,872 A | | 4/1996 | Ohashi |
| 5,635,889 A | | 6/1997 | Stelter |
| 5,886,609 A | | 3/1999 | Stelter |
| 5,934,078 A | | 8/1999 | Lawton, Jr. et al. |
| 6,467,274 B2 | | 10/2002 | Barclay et al. |
| 6,526,759 B2 | * | 3/2003 | Zimm et al. ..................... 62/3.1 |
| 6,653,920 B1 | | 11/2003 | Chen |
| 6,668,560 B2 | | 12/2003 | Zimm et al. |
| 6,680,663 B1 | | 1/2004 | Lee et al. |
| 6,935,121 B2 | | 8/2005 | Fang et al. |
| 6,946,941 B2 | | 9/2005 | Chell |
| 7,148,777 B2 | | 12/2006 | Chell et al. |
| 7,365,623 B2 | | 4/2008 | Xia |
| 2002/0040583 A1 | * | 4/2002 | Barclay et al. ................... 62/3.1 |
| 2002/0053209 A1 | * | 5/2002 | Zimm et al. ..................... 62/3.1 |
| 2003/0106323 A1 | * | 6/2003 | Zimm et al. ..................... 62/3.1 |
| 2004/0130221 A1 | | 7/2004 | Ichii et al. |
| 2004/0140875 A1 | | 7/2004 | Strom |
| 2005/0046533 A1 | | 3/2005 | Chell |
| 2005/0120720 A1 | * | 6/2005 | Fang et al. ....................... 62/3.1 |
| 2005/0242912 A1 | | 11/2005 | Chell et al. |
| 2006/0091733 A1 | | 5/2006 | Binnard et al. |
| 2007/0125094 A1 | * | 6/2007 | Iwasaki et al. ................... 62/3.1 |
| 2007/0130960 A1 | | 6/2007 | Muller et al. |
| 2007/0240428 A1 | * | 10/2007 | Koga et al. ....................... 62/3.1 |
| 2008/0078184 A1 | * | 4/2008 | Saito et al. ....................... 62/3.1 |

FOREIGN PATENT DOCUMENTS

| | | |
|---|---|---|
| DE | 1094358 | 12/1960 |
| EP | 2108904 | 10/2009 |
| FR | 2861454 A1 | 10/2003 |
| FR | 2861455 A1 | 10/2003 |
| FR | 2864211 A1 | 12/2003 |
| JP | 56026416 | 3/1981 |
| JP | 2004342796 | 12/2004 |
| JP | 2008051412 | 3/2008 |
| WO | 2005043052 A1 | 5/2005 |
| WO | 2005074608 A2 | 8/2005 |
| WO | 2009024412 | 2/2009 |

* cited by examiner

MAGNETIC REFRIGERATION DEVICE

BACKGROUND

The present invention relates to a magnetic refrigeration device.

Magnetic refrigeration devices generally include magnets and magnetocaloric material. The magnets are typically moved in an alternating fashion relative to the magnetocaloric material such that the magnetocaloric material experiences an increasing magnetic field when the magnets move closer, thus experiencing a rise in temperature due to the magnetocaloric effect, and a decreasing magnetic field when the magnets move farther away, resulting in a decrease in temperature. Typically, a heat transfer fluid is passed through the magnetocaloric material to absorb the heat from the magnetocaloric material when the magnetic field increases, and the heat transfer fluid is then directed to a heat exchanger that releases the heat to the atmosphere. Then, the heat transfer fluid is passed through the magnetocaloric material to give up heat to the magnetocaloric material when the magnetic field decreases and the heat transfer fluid is directed to another heat exchanger to remove heat from air being circulated into a cooled space.

SUMMARY

In one embodiment, the invention provides a magnetic refrigeration device for transferring heat. The magnetic refrigeration device comprises a motor having an output shaft rotatable about an axis, an inner magnet disposed at one of the axis and a first radial distance from the axis, an outer magnet disposed a second radial distance from the axis outside of the inner magnet, and magnetocaloric material disposed at a third radial distance from the axis between the first and second radial distances. A magnetic gap is defined between the inner and outer magnets. The magnetocaloric material is coupled to the shaft for rotation with the shaft about the axis such that during rotation of the shaft a portion of the magnetocaloric material alternates between a magnetized position disposed within the magnetic gap and a demagnetized position outside of the magnetic gap.

In another aspect, the invention provides a method of operating a magnetic refrigeration device to transfer heat. The method comprises rotating a shaft and a magnetocaloric material with the shaft about an axis, and alternating a portion of the magnetocaloric material between a magnetized position disposed in a magnetic gap and a demagnetized position disposed outside of the magnetic gap. The magnetic gap is defined between an inner magnet disposed at one of the axis and a radial distance from the axis and an outer magnet disposed at a radial distance from the axis outside of the inner magnet.

In yet another aspect, the invention provides another method of operating a magnetic refrigeration device to transfer heat. The method comprises rotating a shaft about an axis, coupling a first magnet to the shaft allowing relative rotation therebetween, magnetically coupling the first magnet with a stationary second magnet such that the first magnet substantially resists rotating with the shaft during rotation of the shaft, rotating a magnetocaloric material with the shaft about the axis, alternating a portion of the magnetocaloric material between a magnetized position disposed within a magnetic gap and a demagnetized position outside of the magnetic gap, and circulating a working fluid of a fluid circuit through the magnetocaloric material to cool a medium to be cooled. The magnetic gap is defined between the first magnet disposed at one of the axis and a radial distance from the axis and the second magnet disposed at a radial distance from the axis outside of the first magnet.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
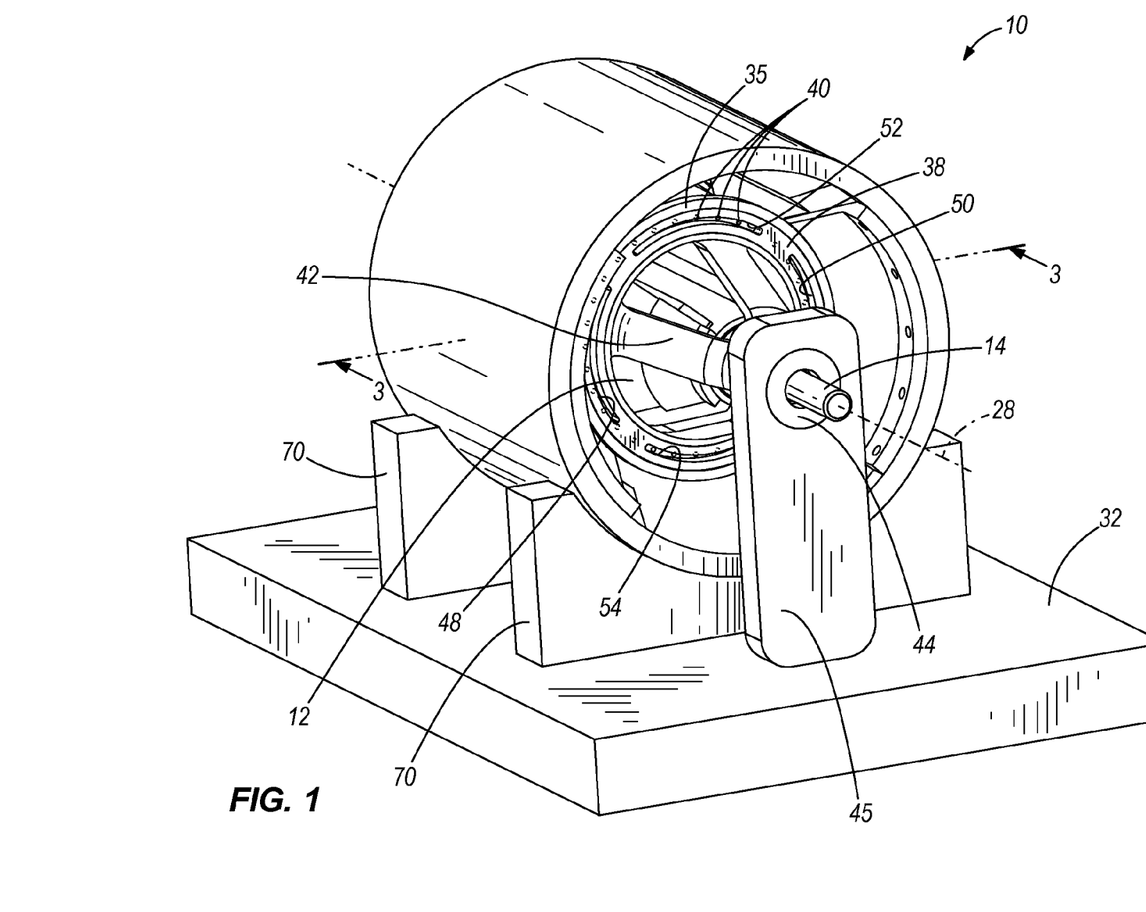
FIG. 1 is a perspective view of a magnetic refrigeration device according to one embodiment of the present invention.
Figure 2:
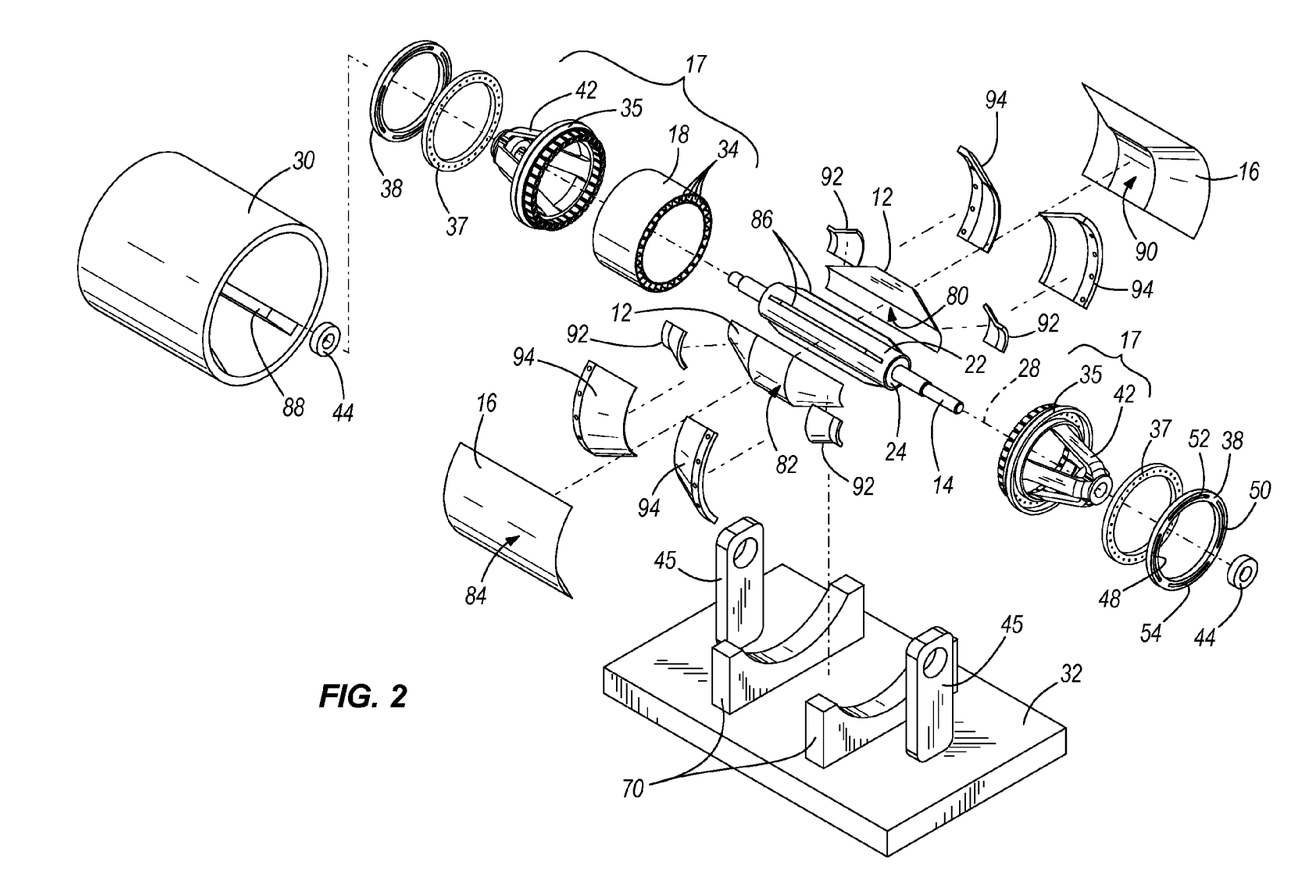
FIG. 2 is an exploded view of the magnetic refrigeration device of FIG. 1.

FIGS. 1 and 2 illustrate a magnetic refrigeration device 10 including a base 32, support members 45, a rotatable shaft 14, a pair of inner magnets 12, a pair of outer magnets 16, and an annular container assembly 17 including a pair of end caps 35, connecting arms 42 and an annular container 18 defining a plurality of channels 34. The annular container 18 contains a magnetocaloric material 20 (shown in FIGS. 3-5).

The rotatable shaft 14 is coupled to an output shaft of a motor 26 (shown schematically in FIG. 6), such as an electric motor. The motor 26 is preferably a variable speed motor, although motors having a single speed or multiple discreet speeds may be employed. The rotatable shaft 14 rotates about an axis 28 and is supported by bearings 44. The bearings 44 are disposed in support members 45 coupled to the base 32.

In the illustrated construction, the inner magnets 12 are permanent magnets having converging and diverging magnetic field lines, although other types of magnets such as isotropic permanent magnets and electromagnets may be used. Permanent magnets having converging and diverging magnetic field lines are described in co-pending U.S. Provisional Application No. 60/997,687, entitled "Permanent Magnet Device," the entire contents of which are incorporated herein by reference.

Figure 3:
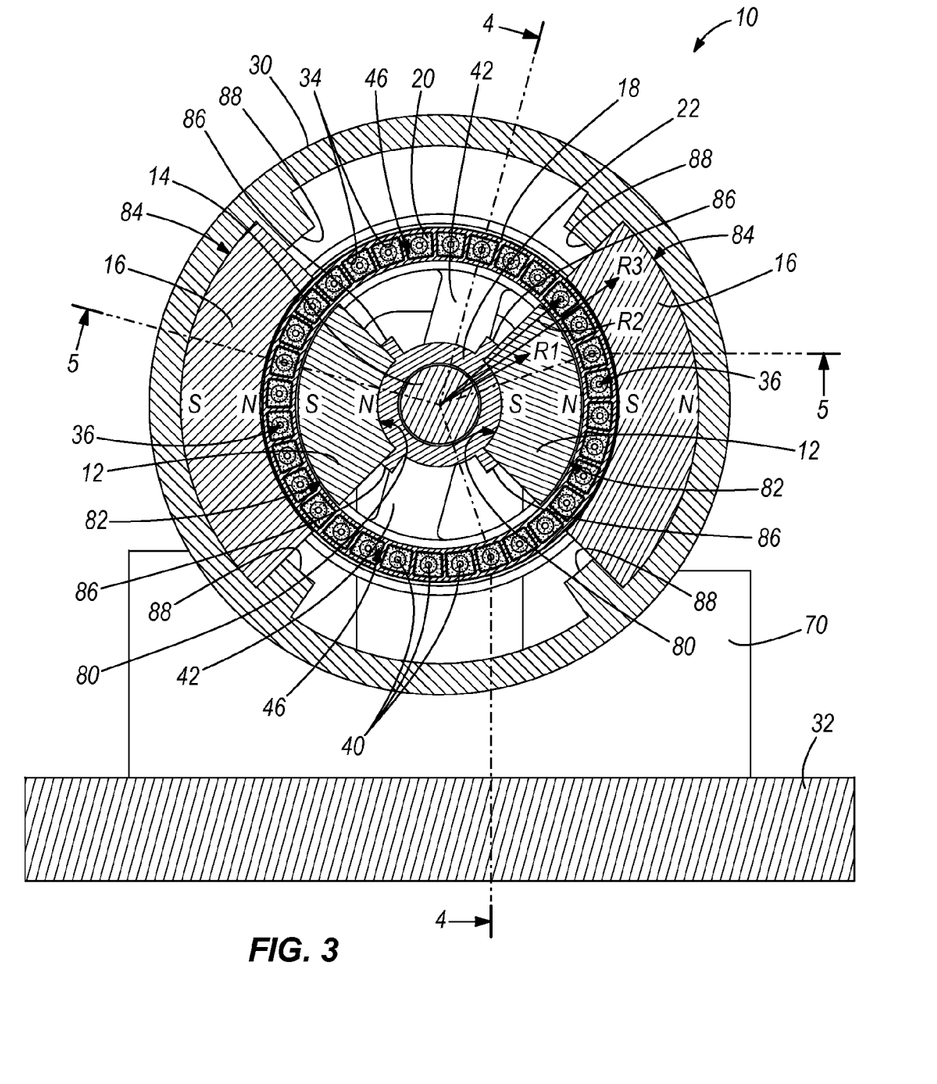
FIG. 3 is a cross section of the magnetic refrigeration device taking along line 3-3 of FIG. 1.
Figure 4:
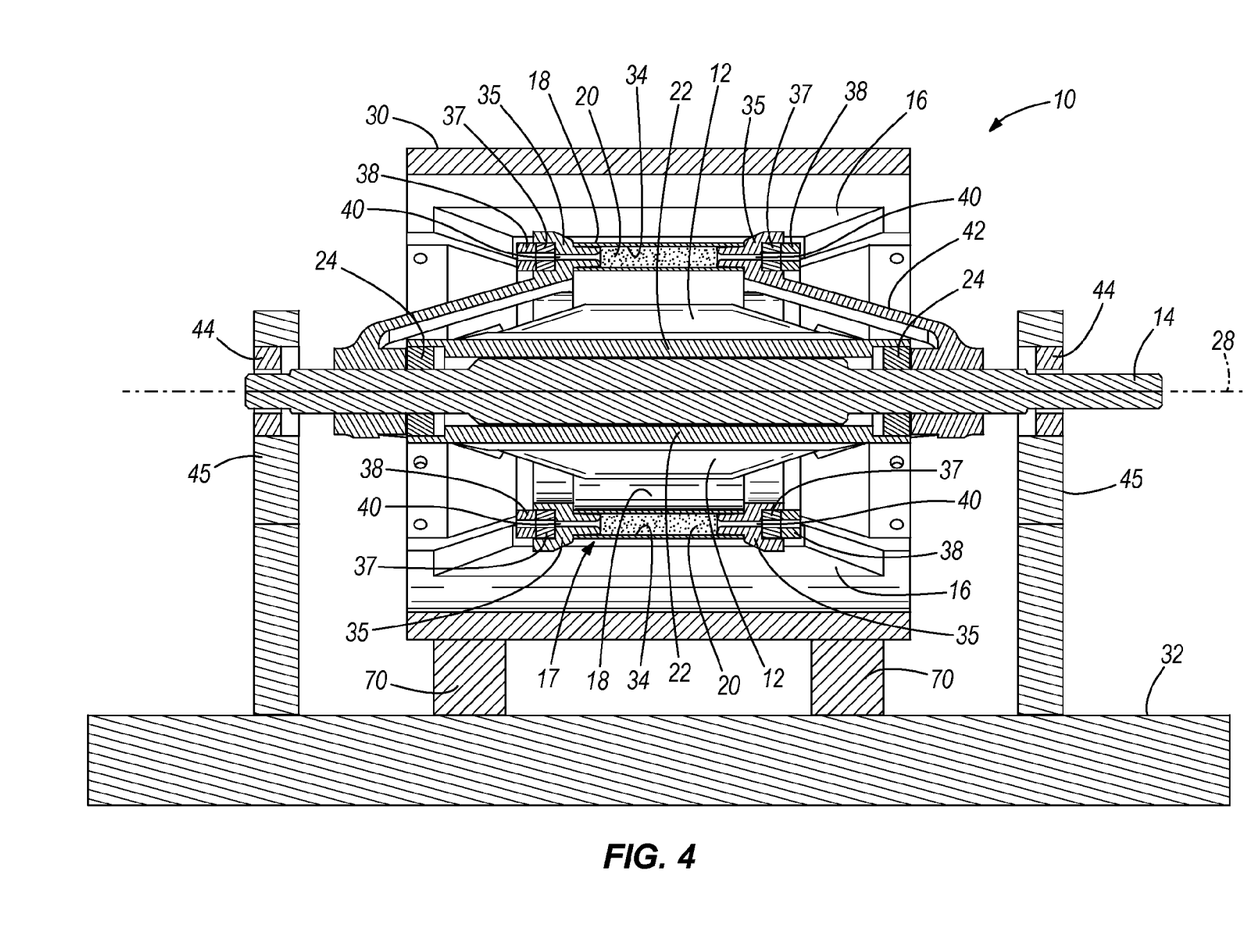
FIG. 4 is a cross section of the magnetic refrigeration device taking along line 4-4 of FIG. 3.
Figure 5:
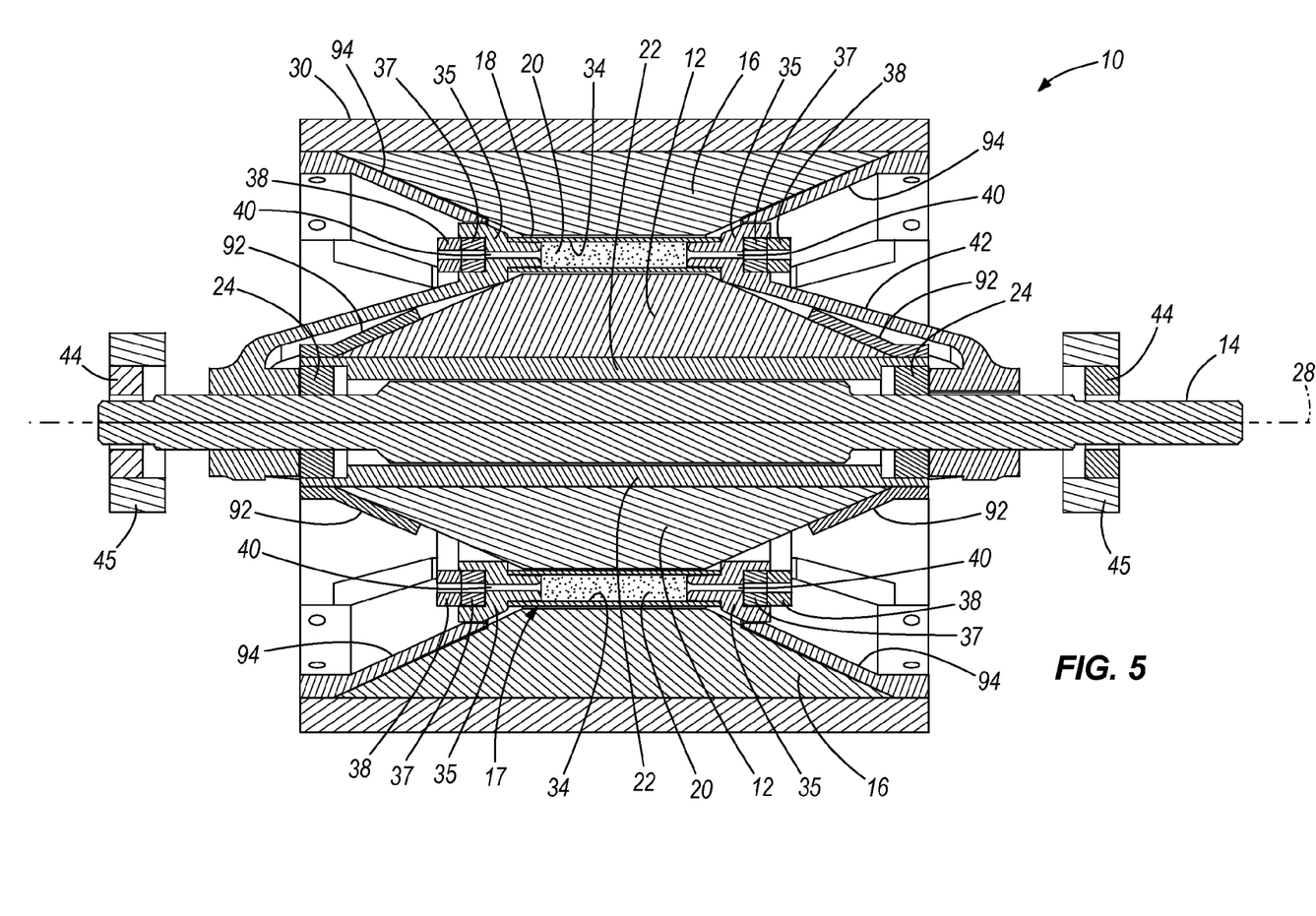
FIG. 5 is a cross section of the magnetic refrigeration device taken along line 5-5 of FIG. 3.

With reference to FIGS. 2, 3 and 5, the inner magnets 12 are coupled to an inner yoke 22, which is in turn coupled to the rotatable shaft 14. Each inner magnet 12 includes an inner surface 80 and an outwardly facing arcuate face 82. Inner surfaces 80 of the inner magnets 12 are coupled to the outer surfaces of the inner yoke 22 by way of glue and/or inner magnet retainers 92, and the inner magnets 12 are spaced equidistantly from each other circumferentially about the axis 28. The inner yoke 22 is cylindrical in shape and includes four radial extensions 86 for holding the inner magnets 12. The inner yoke 22 is preferably made of a magnetically permeable (magnetically soft) material such as 1010 steel or equivalent. The inner yoke 22 is coupled to the rotating shaft 14 by way of bearings 24 located on each axial end of the inner yoke 22, as is best shown in FIGS. 4 and 5. The bearings 24 allow the shaft 14 to rotate without causing rotation of the inner yoke 22 and the inner magnets 12. The inner magnets 12 are disposed at a first radial location R1. In the illustrated construction, a pair of inner magnets 12 is employed. In other constructions, one, three, or more inner magnets may be employed. Accordingly, the number of radial extensions from the inner yoke 22 may vary depending on the number of inner magnets employed.

The inner magnets 12 have a first cross section, shown in FIG. 5, generally defining trapezoids. In the illustrated embodiment, the trapezoids are isosceles trapezoids. In other embodiments, the inner magnets 12 can take other shapes generally converging as they extend radially away from the axis 28. Alternatively, the inner magnets 12 can be rectangular in cross-section, not converging, to save space and allow for a more compact device 10. As can be seen in a second cross section of FIG. 3, the inner magnets 12 have an arcuate shape having a central angle of approximately 90 degrees about the axis 28. The magnets are positioned within the magnetic refrigeration device 10 such that the center of the arcuate shape is coincident with the axis of rotation 28 of the rotating shaft 14. In other constructions, the inner surface 80 and the outwardly facing arcuate face 82 may be the same size and shape.

In one construction, each inner magnet 12 is composed of a plurality of individual magnets extending radially from the axis 28 and bonded together with epoxy, glue or another bonding means such that the north poles of each of the individual magnets are adjacent, and as such is called a congruent magnet. As illustrated in co-pending U.S. Provisional Application No. 60/997,687, entitled "Permanent Magnet Device," approximately sixty individual magnets compose one inner magnet 12. While at least sixty or more are preferred, fewer could be used in an alternate construction to create the same effect. In one construction, each individual magnet effectively includes a portion of the outwardly facing arcuate face 82 and the inner surface 80 of the inner permanent magnet; however, it is not necessary for each and every individual magnet to include these surfaces. In another construction, the inner magnets 12 may be constructed as a single piece having non-parallel magnetic field lines that converge or diverge from one pole to the other. A magnet having non-parallel magnetic field lines that converge and diverge is called a congruent magnet and can be constructed in any way that accomplishes this effect—including, but not limited to, the ways described above.

The inner magnets 12 are preferably high remnant flux density Br magnets such as NdFeB (Neodymium Iron Boron) N52 or any other equivalent high remnant flux density Br magnets.

With reference to FIGS. 4 and 5, the annular container assembly 17 is fixedly coupled to the rotating shaft 14 for rotation with the rotating shaft 14. The annular container assembly 17 includes the annular container 18 having fluidly separate hollow interior portions defining a plurality of channels 34. The plurality of channels 34 are configured to extend axially when the annular container assembly 17 is coupled to the rotating shaft 14. The pair of end caps 35 are coupled to the annular container 18 to close off each axial end of the annular container 18, further defining the plurality of channels 34 and defining a plurality of apertures 40 to fluidly communicate with each of the plurality of channels 34, respectively. Each end cap 35 includes an annular recess or groove for receiving a rotary seal 37, which is coupled thereto. The rotary seal 37 includes a stronger and more wear-resistant material than the end cap 35. Each rotary seal 37 is generally annular and includes apertures further defining the plurality of apertures 40 fluidly communicating with each of the plurality of channels 34, respectively. The number of apertures 40 in each end cap 35 and rotary seal 37 preferably equals the number of channels 34. One of the plurality of apertures 40 is located at each axial end of one of the plurality of channels 34 to form fluid inlets and outlets for each of the plurality of channels 34. In other constructions, two or more of the plurality of apertures 40 may be located at each axial end of one of the plurality of channels 34. The number of channels 34 is preferably at least four; however, eight or more channels are preferred in order increase efficiency, which will be explained in greater detail below. In the illustrated construction, the number of channels 34 is thirty-two. Further in other constructions, the rotary seal 37 may be any other shape and configuration that communicates a flow of fluid between the rotating portion and the stationary portion of the device 10. Similarly, the end cap 35 may be any other shape and configuration. In other constructions, the rotary seal 37 can be separate from the end cap 35 to minimize the size of the rotary seal 37 and minimize the dead fluid volume (i.e., the fluid volume between the interface of the rotary and stationary seals 37, 38 and the annular container 18).

Each of the plurality of channels 34 is fluidly separate and contains magnetocaloric material 20 in a form such as a powder, small pellets or beads, a porous solid, and the like, such that a fluid can flow therethrough. The fluid flows axially through one of the plurality of apertures 40, into one of the channels 34 and through the magnetocaloric material 20 in a heat exchange relationship therewith, and finally exits the annular container assembly 17 by way of another one of the plurality of apertures on the opposite axial end of the annular container assembly 17.

The annular container assembly 17 and the rotary seals 37 are fixedly coupled to the rotating shaft 14 by way of connecting arms 42 for rotation with the rotating shaft 14. In the illustrated construction, the end cap 35 and the connecting arms 42 are formed together as one piece. In other constructions, the end cap 35 and the connecting arms 42 may be separate pieces coupled together. The connecting arms 42 are formed as one piece with the end caps 35 and include a collar portion coupled to the rotating shaft 14. The annular container 18 is disposed at a second radial position R2. The second radial position R2 is farther from the axis 28 than the first radial position R1 such that the annular container 18 is disposed outside of the pair of inner magnets 12. In other constructions, the annular container 18 may be an arcuate container or a plurality of arcuate containers coupled fixedly to the rotating shaft 14.

In the illustrated construction, the outer magnets 16 are permanent magnets having converging and diverging magnetic field lines, although other types of magnets such as isotropic permanent magnets and electromagnets may be used. Permanent magnets having converging and diverging magnetic field lines are described in co-pending U.S. Provisional Application No. 60/997,687, entitled "Permanent Magnet Device," the entire contents of which are incorporated herein by reference.

With reference to FIGS. 2, 3 and 5, the outer magnets 16 are coupled to a stationary yoke 30 by way of glue and/or outer magnet retainers 94. The stationary yoke 30 is in turn fixedly coupled to the base 32. Each outer magnet 16 includes an outer surface 84 and an inwardly facing arcuate face 90. Outer surfaces 84 of the outer magnets 16 are coupled to the inner surfaces of the stationary yoke 30, and the outer magnets 16 are spaced equidistantly from each other circumferentially about the axis 28. The stationary yoke 30 is cylindrical in shape and includes four radial extensions 88 for holding the outer magnets 16. The stationary yoke 30 is preferably made of a magnetically permeable (magnetically soft) material such as 1010 steel or equivalent. The stationary yoke 30 is coupled to the base 32 by way of a pair of legs 70. The outer magnets 16 are disposed at a third radial location R3 outside the annular container 18 and the magnetocaloric material 20; i.e., the third radial position is further from the axis 28 than the second radial position. In the illustrated construction, a pair of outer magnets 16 is employed. In other constructions, one, three, or more outer magnets may be employed. Preferably, the number of outer magnets 16 is equal to the number of inner magnets 12. Accordingly, the number of radially-inward extensions from the stationary yoke 30 may vary depending on the number of outer magnets employed.

The outer magnets 16 have a first cross section, shown in FIG. 5, generally defining trapezoids. In the illustrated embodiment, the trapezoids are isosceles trapezoids. In other embodiments, the outer magnets 16 can take other shapes generally diverging as they extend radially away from the axis 28. Alternatively, the outer magnets 16 can be rectangular in cross-section, not converging, to save space and allow for a more compact device 10. As can be seen in a second cross section of FIG. 3, the outer magnets 16 have an arcuate shape having a central angle of approximately 90 degrees about the axis 28. The magnets are positioned within the magnetic refrigeration device 10 such that the center of the arcuate shape is coincident with the axis of rotation 28 of the rotating shaft 14. In other constructions, the outer surface 84 and the inwardly facing arcuate face 90 may be the same size and shape.

In one construction, each outer magnet 16 is composed of a plurality of individual magnets extending radially from the axis 28 and bonded together with epoxy, glue or another bonding means such that the north poles of each of the individual magnets are adjacent, and as such is called a congruent magnet. As illustrated in co-pending U.S. Provisional Application No. 60/997,687, entitled "Permanent Magnet Device," approximately sixty individual magnets compose an outer magnet 16; however, more or fewer could be used in an alternate construction to create the same effect. In one construction, each individual magnet effectively includes a portion of the outer surface 84 and the inwardly facing arcuate face 90 of the outer permanent magnet 16; however, it is not necessary for each and every individual magnet to include these surfaces. In a preferred construction, the outer magnets 16 may be constructed as a single piece having non-parallel magnetic field lines that converge or diverge from one pole to the other. A magnet having non-parallel magnetic field lines that converge and diverge is called a congruent magnet and can be constructed in any way that accomplishes this effect— including, but not limited to, the ways described above.

The outer magnets 16 are preferably high remnant flux density Br magnets such as NdFeB (Neodymium Iron Boron) N52 or any other equivalent high remnant flux density Br magnets.

Each inner magnet 12 is paired with an outer magnet 16 such that each pair of inner 12 and outer 16 magnets share the same central axis 28 and occupy the same angular space with respect to central axis 28. The outwardly facing arcuate surface 82 of each inner magnet 12 directly faces the inwardly facing arcuate surface 90 of the respective adjacent outer magnet 16.

A magnetic gap 36 is defined between each pair of one of the outer magnets 16 and one of the inner magnets 12. More specifically, the magnetic gap 36 is defined as the space between the outwardly facing arcuate surface 82 of the inner magnet 12 and the inwardly facing arcuate surface 90 of the outer magnet 16, which are similarly sized and directly facing. At least a portion of the annular container assembly 17 containing magnetocaloric material 20 is located in the magnetic gap 36, which will be described in further detail below. Another portion of the annular container assembly 17 containing magnetocaloric material 20 is located in a non-magnetic gap 46, as illustrated in FIG. 3, which is not directly between the outwardly facing arcuate surface 82 of the inner magnet 12 and the inwardly facing arcuate surface 90 of the respective adjacent outer magnet 16. Thus, the illustrated construction includes two magnetic gaps 36 and two non-magnetic gaps 46.

In the illustrated construction, the arrangement of inner magnets 12, outer magnets 16, inner yoke 22 and outer yoke 30 form a magnetic field circuit that flows through the magnetic gaps 36. The shape and construction of the magnets 12, 16 of the present invention, with the convergent portions being adjacent to the magnetic gap 36, concentrates (and thus strengthens) the magnetic field through the magnetic gap and thus through the magnetocaloric material 20 disposed in the magnetic gap 36. With reference to FIG. 3, each inner magnet 12 is paired with an outer magnet 16 such that each pair of inner 12 and outer 16 magnets occupy the same angular space with respect to the central axis 28. The magnets 12 and 16 are arranged having a first magnetic pole (i.e., the north or south pole) facing one direction and a second magnetic pole (i.e., the other of the north or south pole) facing a second direction. In this way, each magnet 12 and 16 is positioned with opposite poles adjacent each other such that each magnet 12 and 16 is magnetically attracted to adjacent magnets, creating a magnetic field between each magnet. The inner and outer yokes 22 and 30 are made of magnetically permeable material, as described above, to allow the passage of magnetic field therethrough and create a circuit of magnetic field from one outer magnet 16, through the magnetic gap 36, to the adjacent inner magnet 12, through the inner yoke 22, through a second inner magnet 12, through the magnetic gap 36, through the second outer magnet 16 and through the circumference of the stationary yoke 30 back to the first outer magnet 16.

The stationary seal 38 is positioned axially adjacent the rotary seal 37, as illustrated in FIGS. 2, 4 and 5. The stationary seal 38 is annular in shape and includes a first slot 48, a second slot 50, a third slot 52, and a fourth slot 54. When viewed from the end of the magnetic refrigeration device 10, the first slot 48 and the second slot 50 are positioned in the magnetic gaps 36, and the third slot 52 and the fourth slot 54 are not positioned within the magnetic gaps 36 (i.e., they are positioned in the non-magnetic gaps 46). Stated another way, the first slot 48 and the second slot 50 are aligned with the magnetic gap 36 when viewed from the end of the magnetic refrigeration device 10, and the third slot 52 and the fourth slot 54 are aligned with the non-magnetic gaps 46. The number of slots preferably corresponds to the total number of magnetic gaps 36 and non-magnetic gaps 46. In the illustrated construction, there are two magnetic gaps 36 and two non-magnetic gaps 46. However, in other constructions, a different number of slots may be employed.

Figure 6:
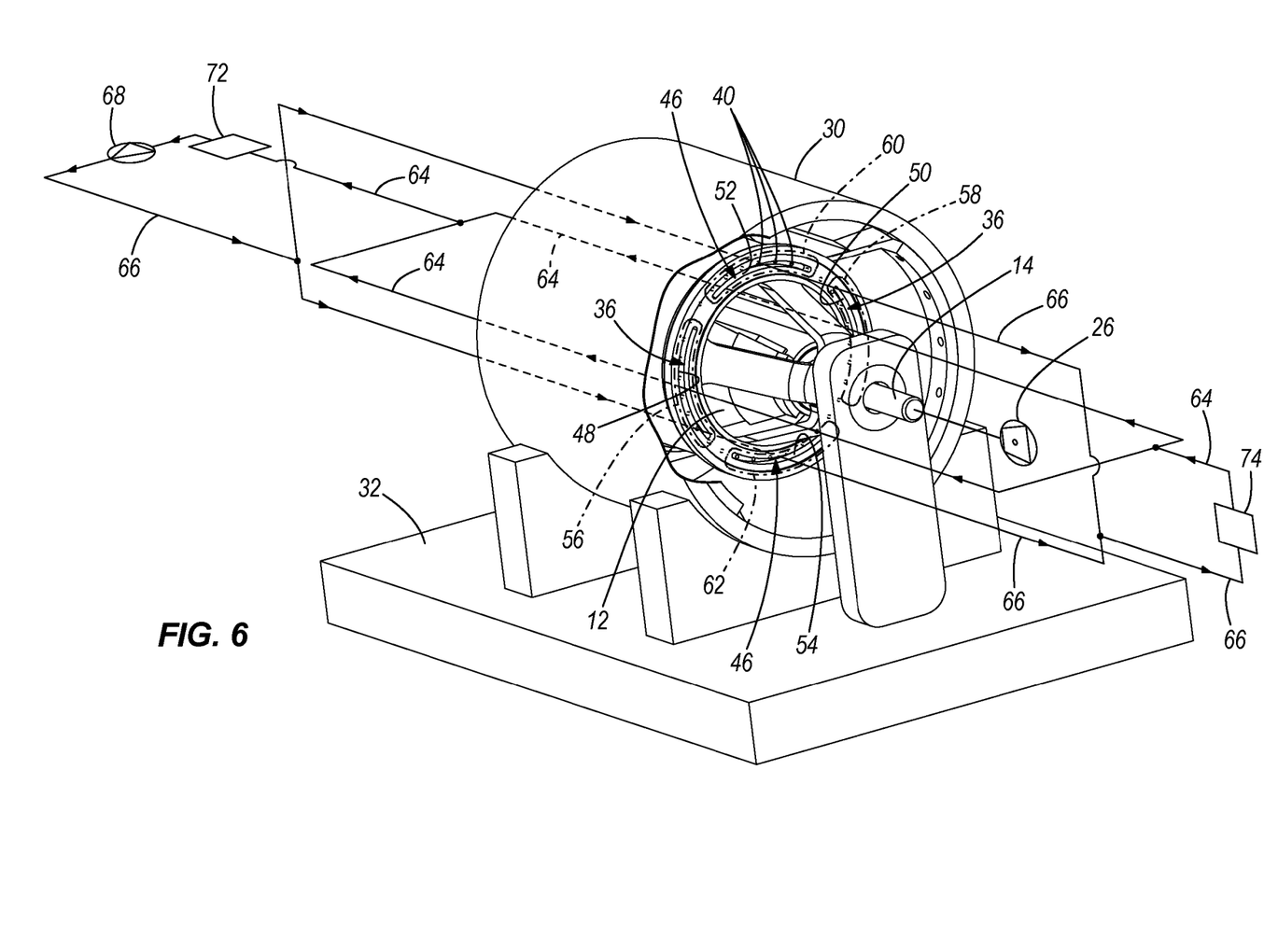
FIG. 6 is a schematic view of a magnetic refrigeration system utilizing the magnetic refrigeration device of FIG. 1.

With reference to FIG. 6, the plurality of apertures 40 and their corresponding channels 34 rotate through at least four positions 56, 58, 60, 62. Each position 56, 58, 60, 62 is illustrated with broken lines in FIG. 6. A first position 56 and a second position 58 are located in the magnetic gaps 36. The plurality of apertures 40 located in the first position 56 is fluidly connected to the first slot 48. Likewise, the plurality of apertures 40 located in the second position 58 is fluidly connected to the second slot 50. The first slot 48 and the second slot 50 are fluidly connected to a hot heat exchanger 72 and to a cold heat exchanger 74 by way of hot fluid conduits 64, as illustrated in FIG. 6.

A third position 60 and a fourth position 62 are located outside of the magnetic gap (i.e., in the non-magnetic gap 46). The plurality of apertures located in the third position 60 is fluidly connected to the third slot 52. Likewise, the plurality of apertures located in the fourth position 62 is fluidly connected to the fourth slot 54. The third slot 52 and the fourth slot 54 are fluidly connected to the hot heat exchanger 72 and to the cold heat exchanger 74 by way of cold fluid conduits 66. A pump 68 is preferably positioned just downstream of the hot heat exchanger 72 and is operable to circulate a heat transfer fluid through the cold fluid conduits 66 and the hot fluid conduits 64. In other constructions, the pump 68 may be positioned elsewhere in fluid communication with the cold fluid conduits 66 or the hot fluid conduits 64.

In operation, the magnetic refrigeration device utilizes the magnetocaloric effect to absorb heat from a medium to be cooled.

As the motor 26 rotates, the rotatable shaft 14 rotates therewith. The outer magnets 16 are stationary. The inner magnets 12, which are coupled to the rotatable shaft 14 by way of bearings 24, are magnetically coupled to the stationary outer magnets 16. As a result, the rotatable shaft rotates in communication with the bearings 24 without causing the inner magnets 12 to rotate. Thus, the inner magnets 12 are substantially stationary. Furthermore, the magnetic gaps 36, located between pairs of one of the inner magnets 12 and one of the outer magnets 16, are also stationary.

The rotatable shaft 14 is coupled to the connecting arms 42, as described above. The rotation of the motor 26 causes the annular container 18, including the end caps 35, the connecting arms 42, the rotary seals 37 and the channels 34 containing magnetocaloric material 20, to rotate with the rotatable shaft 14. As the magnetocaloric material 20 rotates, the magnetocaloric material 20 alternates between a magnetized position disposed within the magnetic gap 36 (e.g., the first position 56 or the second position 58) and a demagnetized position outside of the magnetic gap 36 (e.g., the third position 60 or the fourth position 62). As a result of the magnetocaloric effect, the magnetocaloric material 20 heats up when magnetized and cools when demagnetized.

A heat transfer fluid is continuously circulated throughout a system of conduits 64, 66, channels 34, and heat exchangers 72, 74 in the direction indicated by the arrows in FIG. 6. The cold heat exchanger 74 functions similarly to an evaporator in a conventional refrigeration system, absorbing heat from a medium to be cooled; however, the heat transfer fluid does not necessarily evaporate. Heat absorbed by the cold heat exchanger 74 is carried by the heat transfer fluid by way of the hot fluid conduits 64 and passes through the magnetocaloric material 20 positioned within the magnetic gaps 36 (corresponding to the first and second positions 56, 58). As a result of the magnetocaloric effect, the magnetocaloric material 20 positioned in the magnetic gaps 36 experiences a rise in temperature (i.e., heat) when it is magnetized. This heat is absorbed by the heat transfer fluid and carried, by way of the hot fluid conduits 64, to the hot heat exchanger 72. The hot heat exchanger 72 functions similarly to a condenser in a conventional refrigeration system, rejecting heat to a cooling medium; however, the heat transfer fluid does not necessarily condense. The cooled heat transfer fluid is then pumped by the pump 68 toward the third and fourth positions 60, 62 by way of cold fluid conduits 66 and passes through the magnetocaloric material 20 positioned outside of the magnetic gaps 36 (i.e., in the non-magnetic gaps 46). As a result of the magnetocaloric effect, the magnetocaloric material 20 positioned outside of the magnetic gaps 36 experiences a decrease in temperature when it is demagnetized. Thus, the heat transfer fluid is further cooled as it passes through the magnetocaloric material 20 positioned outside of the magnetic gaps 36. The further-cooled heat transfer fluid is carried by way of the cold fluid conduits 66 toward the cold heat exchanger 74 and the cycle repeats.

As a result of heat transfer between the heat transfer fluid and the magnetocaloric material 20, and because the heat transfer fluid reciprocates through the magnetocaloric material 20 as the magnetocaloric material 20 reciprocates between magnetized and demagnetized positions, a temperature gradient is formed in the magnetocaloric material 20 in an axial direction, the hot side of the gradient being adjacent the hot heat exchanger 72 and the cold side of the gradient being adjacent the cold heat exchanger 74 (i.e., active magnetic regeneration). To maximize performance of the device 10 (i.e., to most efficiently utilize the temperature gradient for heating and cooling the heat transfer fluid), the ratio of length to cross sectional area of the magnetocaloric material 20 is optimized.

As illustrated in FIG. 6, fluid flow through the slots 48, 50, 52, 54, the conduits 64, 66, the heat exchangers 72, 74 and the pump 68 is uni-directional. Fluid flow through the channels 34 containing magnetocaloric material 20 is bi-directional, depending on the position of a channel at a given time during its rotation, and substantially parallel to the axis 28. When one of the channels 34 is located in the magnetized position (e.g., the first position 56 or the second position 58), fluid flows therethrough in a first direction from the cold heat exchanger 74 toward the hot heat exchanger 72. When one of the channels 34 is located in the demagnetized position (e.g., the third position 60 or the fourth position 62), fluid flows therethrough in a second direction from the hot heat exchanger 72 toward the cold heat exchanger 74. The second direction is substantially opposite the first direction. Fluid flowing through the first position 56 and the second position 58 always flows in the first direction. Fluid flowing through the third position 60 and the fourth position 62 always flows in the second direction. Each channel 34 experiences an immediate switch in fluid flow direction every time the channel 34 passes from the magnetized position to the demagnetized position, and vice versa. As long as the channel 34 remains within the magnetized position, fluid flow through the channel 34 is in the first direction. Conversely, as long as the channel 34 remains within the demagnetized position, fluid flow through the channel 34 is in the second direction.

The fluid flow through the stationary outside loop including the stationary seals 38, the conduits 64, 66, the heat exchangers 72, 74 and the pump 68, is continuous and uni-directional. That is, the stationary outside loop of the device 10 does not experience a pause in the flow of heat transfer fluid therethrough. As mentioned above, the heat transfer fluid is continuously circulated throughout the system of conduits 64, 66, channels 34, and heat exchangers 72, 74 in the direction indicated by the arrows in FIG. 6. This increases the efficiency of the device 10 because the fluid pump 68 does not waste energy with frequent starts and stops. Furthermore, heat transfer between the hot and cold heat exchangers 72, 74 and their respective surroundings occurs continuously without pause.

The efficiency of the device 10 increases as the size of the channels 34 decreases and the number of channels 34 increases to minimize the number and volume of idle channels (i.e., channels that are not fluidly connected to the stationary outside loop. As discussed above, the annular container is divided into thirty-two channels. As each channel 34 moves between the magnetic gap 36 and the non-magnetic gap 46, it experiences a transition period on the border between the magnetic gap 36 and the non-magnetic gap 46 in which the magnetocaloric material 20 is neither fully magnetized nor fully demagnetized. Furthermore, in the transition period, one channel 34 (i.e., an idle channel) is not in fluid communication with one of the slots 48, 50, 52, 54 and therefore does not communicate heat transfer fluid to the conduits 64, 66. At one time, four of the channels 34 are idle and not in fluid communication with the conduits 64, 66. The longer the transition period, and the more heat transfer fluid and magnetocaloric material 20 is unavailable during the transition period, the less efficient the heat transfer device 10. Therefore, decreasing the size of the channels 34 and increasing the number of channels 34 minimizes the amount of magnetocaloric material 20 and heat transfer fluid in the idle transition period at any given time and increases the efficiency of the refrigeration device 10. However, too many channels 34 add to the complexity of the device 10.

To increase cooling capacity of the device 10, the speed of the motor 26 may be increased, which causes the magnetocaloric material 20 to pass in and out of the magnetic gap 36 more frequently. Employing a variable speed motor also increases the efficiency of the device 10 as speed can be lowered, and thus energy consumption reduced, during lower cooling demands.

The speed of the fluid pump 68 may also be increased, preferably depending on motor 26 speed, to increase the cooling capacity of the device 10.

Thus, the invention provides, among other things, a magnetic refrigeration device. Various features and advantages of the invention are set forth in the following claims.

What is claimed is:

1. A magnetic refrigeration device for transferring heat, the magnetic refrigeration device comprising: a shaft rotatable about an axis; an inner magnet disposed at one of the axis and a radial distance from the axis; an outer magnet disposed a radial distance from the axis outside of the inner magnet defining a magnetic gap between the inner and outer magnets; and magnetocaloric material disposed at a radial distance from the axis between the radial distances of the inner and outer magnets, wherein the magnetocaloric material is coupled to the shaft for rotation with the shaft about the axis such that during rotation of the shaft a portion of the magnetocaloric material alternates between a magnetized position disposed within the magnetic gap and a demagnetized position outside of the magnetic gap; wherein the magnetocaloric material is contained in an annular container; and wherein the annular container is divided into a plurality of channels extending axially, and wherein the annular container is coupled to the shaft for rotation with the shaft about the axis such that during rotation of the shaft at least a portion of each of the plurality of channels alternates between the magnetized position and the demagnetized position.

2. The magnetic refrigeration device of claim 1, further comprising a fluid circuit that transfers fluid from a cold heat exchanger to the magnetocaloric material in the magnetized position, from the magnetocaloric material in the magnetized position to a hot heat exchanger, from the hot heat exchanger to the magnetocaloric material in the demagnetized position, and from the magnetocaloric material in the demagnetized position to the cold heat exchanger, wherein the cold heat exchanger is configured to absorb heat from a medium to be cooled, and wherein the hot heat exchanger is configured to reject heat.

3. The magnetic refrigeration device of claim 1, wherein the plurality of channels is configured for bi-directional axial fluid flow therethrough.

4. The magnetic refrigeration device of claim 3, wherein one of the plurality of channels is configured for fluid flow therethrough in a first direction when the one of the plurality of channels is in the magnetized position, and wherein the one of the plurality of channels is configured for fluid flow therethrough in a second direction when the one of the plurality of channels is in the demagnetized position, wherein the first direction is opposite to the second direction.

5. The magnetic refrigeration device of claim 4, further comprising a rotary seal coupled to the annular container for rotation with the annular container, wherein the rotary seal includes a plurality of apertures, and wherein each one of the plurality of apertures is fluidly connected to a corresponding one of the plurality of channels.

6. The magnetic refrigeration device of claim 5, further comprising a stationary seal adjacent to the rotary seal, wherein the stationary seal is configured to be stationary and includes a plurality of slots in fluid communication with the plurality of apertures.

7. The magnetic refrigeration device of claim 6, wherein the plurality of slots includes a first slot in fluid communication with the portion of the plurality of channels in the magnetized position, and a second slot in fluid communication with the portion of the plurality of channels in the demagnetized position.

8. The magnetic refrigeration device of claim 7, wherein fluid flows through the first slot in the first direction, and wherein fluid flows through the second slot in the second direction.

9. The magnetic refrigeration device of claim 8, further comprising a fluid circuit configured to transfer fluid from a cold heat exchanger to the magnetocaloric material in the magnetized position, from the magnetocaloric material in the magnetized position to a hot heat exchanger, from the hot heat exchanger to the magnetocaloric material in the demagnetized position, and from the magnetocaloric material in the demagnetized position to the cold heat exchanger, wherein the cold heat exchanger is configured to absorb heat from a medium to be cooled, and wherein the hot heat exchanger is configured to reject heat.

10. The magnetic refrigeration device of claim 9, wherein the fluid circuit includes a pump configured to circulate a working fluid through the fluid circuit.

11. The magnetic refrigeration device of claim 1, further comprising an inner yoke coupled to the inner permanent magnet.

12. The magnetic refrigeration device of claim 11, wherein the inner yoke is coupled to the shaft by way of a bearing that allows the inner yoke to remain stationary as the shaft rotates.

13. The magnetic refrigeration device of claim 12, further comprising a stationary cylindrical outer yoke including a magnetic permeable material coupled to the outer permanent magnet.

14. The magnetic refrigeration device of claim 1, wherein the outer magnet is configured to be stationary, wherein the inner magnet is coupled to the outer magnet by way of magnetic force, and wherein the inner magnet is substantially fixed relative to the outer magnet.

15. The magnetic refrigeration device of claim 1, wherein the magnetocaloric material is contained in a container configured for bi-directional fluid flow therethrough.

16. The magnetic refrigeration device of claim 15, wherein the container is configured for fluid flow in a first direction when the container is located in the magnetized position, and wherein the container is configured for fluid flow in a second direction when the container is located in the demagnetized position.

17. The magnetic refrigeration device of claim 1, wherein the magnetocaloric material is contained in a container configured for axial fluid flow therethrough.

18. A method of operating a magnetic refrigeration device to transfer heat, the method comprising:
rotating a shaft and a magnetocaloric material with the shaft about an axis; and
alternating a portion of the magnetocaloric material between a magnetized position disposed in a magnetic gap defined between an inner magnet disposed at one of the axis and a radial distance from the axis and an outer magnet disposed at a radial distance from the axis outside of the inner magnet, and a demagnetized position disposed outside of the magnetic gap.

19. The method of claim 18, further comprising moving a fluid through the magnetocaloric material in a first direction when the magnetocaloric material is in the magnetic gap and in a second direction when the magnetocaloric material is outside of the magnetic gap.

20. The method of claim 18, further comprising circulating a working fluid uni-directionally through a stationary portion including a hot heat exchanger configured to reject heat and a cold heat exchanger configured to absorb heat from a medium to be cooled, and circulating a working fluid bi-directionally through a rotary portion including the magnetocaloric material.

21. The method of claim 20, further comprising continuously circulating the working fluid through the hot heat exchanger and the cold heat exchanger during operation of the magnetic refrigeration device.

22. The method of claim 18, further comprising cooling a medium by circulating a working fluid from the portion of the magnetocaloric material outside of the magnetic gap to the cold heat exchanger and absorbing heat from the medium by way of the cold heat exchanger.

23. The method of transferring heat of claim 18, further comprising circulating a working fluid through the magnetocaloric material in a direction substantially parallel to the axis.

24. The method of transferring heat of claim 18, further comprising dividing the magnetocaloric material into a plurality of sections extending parallel to the axis.

25. The method of claim 18, further comprising continuously circulating a working fluid through the magnetocaloric material, through a hot heat exchanger configured to reject heat and through a cold heat exchanger configured to absorb heat from a medium to be cooled, during operation of the magnetic refrigeration device.

26. The method of claim 18, further comprising coupling the inner magnet to the shaft, allowing relative rotation therebetween.

27. The method of claim 26, further comprising: fixing the outer magnet with respect to the shaft; and magnetically coupling the inner magnet with the outer magnet such that the inner magnet substantially resists rotating with the shaft during rotation of the shaft.

* * * * *

UNITED STATES PATENT AND TRADEMARK OFFICE
CERTIFICATE OF CORRECTION

PATENT NO.        : 8,209,988 B2
APPLICATION NO.   : 12/236583
DATED             : July 3, 2012
INVENTOR(S)       : Ming Zhang and Sesha Madireddi It is certified that error appears in the above-identified patent and that said Letters Patent is hereby corrected as shown below:

Title page, item [73] Assignee:

change "Husssmann Corporation" to --Hussmann Corporation--

Signed and Sealed this
Sixth Day of November, 2012

David J. Kappos
*Director of the United States Patent and Trademark Office*